(12) United States Patent
Zhang et al.

(10) Patent No.: US 11,221,471 B2
(45) Date of Patent: Jan. 11, 2022

(54) FREEFORM SURFACE OFF-AXIS THREE-MIRROR OPTICAL SYSTEM

(71) Applicants: Tsinghua University, Beijing (CN); HON HAI PRECISION INDUSTRY CO., LTD., New Taipei (TW)

(72) Inventors: Ben-qi Zhang, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/998,184

(22) Filed: Aug. 20, 2020

(65) Prior Publication Data

US 2021/0373303 A1 Dec. 2, 2021

(30) Foreign Application Priority Data

May 29, 2020 (CN) .......................... 202010481757.2

(51) Int. Cl.
*G02B 17/06* (2006.01)
(52) U.S. Cl.
CPC ................................ *G02B 17/0642* (2013.01)
(58) Field of Classification Search
CPC ............ G02B 17/0626; G02B 17/0631; G02B 17/0642
See application file for complete search history.

(56) References Cited

U.S. PATENT DOCUMENTS

| | | | | |
|---|---|---|---|---|
| 2015/0346022 | A1* | 12/2015 | Yang ................... | G02B 17/0642 250/216 |
| 2016/0170191 | A1* | 6/2016 | Hou .................... | G02B 17/0626 359/858 |
| 2017/0285313 | A1* | 10/2017 | Zhu ......................... | G02B 17/02 |
| 2018/0136039 | A1* | 5/2018 | Rolland ................ | G01J 3/0208 |
| 2018/0157017 | A1* | 6/2018 | Gong ................. | G02B 17/0642 |
| 2019/0250033 | A1* | 8/2019 | Zhu .......................... | G01J 3/024 |

FOREIGN PATENT DOCUMENTS

TW 201937228 9/2019

* cited by examiner

*Primary Examiner* — Robert E. Tallman
(74) *Attorney, Agent, or Firm* — ScienbiziP, P.C.

(57) ABSTRACT

A freeform surface off-axis three-mirror optical system comprises a primary mirror, a secondary mirror, a tertiary mirror, an aperture stop located on the secondary mirror, and an image surface. An incident light beam emitted from an object irradiates and is reflected on the primary mirror to form a first reflected light beam. The first reflected light beam irradiates and is reflected on the secondary mirror to form a second reflected light beam. The second reflected light beam passes through the incident light beam, and then irradiates and is reflected on the tertiary mirror to form a third reflected light beam. The third reflected light beam passes through the incident light beam and does not pass through the secondary mirror, and finally reaches the image surface for imaging. A reflective surface of each of the primary mirror, the secondary mirror, and the tertiary mirror is an xy polynomial freeform surface.

20 Claims, 4 Drawing Sheets

FREEFORM SURFACE OFF-AXIS THREE-MIRROR OPTICAL SYSTEM

CROSS-REFERENCE TO RELATED APPLICATIONS

This application claims all benefits accruing under 35 U.S.C. § 119 from China Patent Application No. 202010481757.2, field on May 29, 2020 in the China National Intellectual Property Administration, disclosure of which is incorporated herein by reference. The application is also related to copending applications entitled, "METHOD FOR DESIGNING FREEFORM SURFACE IMAGING SYSTEMS", filed Aug. 20, 20202 Ser. No. 16/998,185.

FIELD

The subject matter herein generally relates to a field of optical design, in particular to a freeform surface off-axis three-mirror optical system.

BACKGROUND

A freeform surface is a surface that cannot be represented by a spherical or aspherical surface, and freeform surfaces are usually used in off-axis systems. As a benefit of the high numbers of degrees of freedom for optical systems, novel and high-performance optical systems can be obtained. A freeform surface system can meet the needs of high-tech imaging systems and has broad application prospects.

A structure of the freeform surface system is changeable, and the compactness and volume of different structures are different. A compact freeform surface off-axis three-mirror optical system has higher application value and is also an important indicator in a freeform surface optical design.

Therefore, it will be of great significance to design a freeform surface off-axis three-mirror optical system with a smaller volume and a more compact structure under the same index.

BRIEF DESCRIPTION OF THE DRAWINGS

Implementations of the present technology will now be described, by way of example only, with reference to the attached figures.

DETAILED DESCRIPTION

Figure 1:
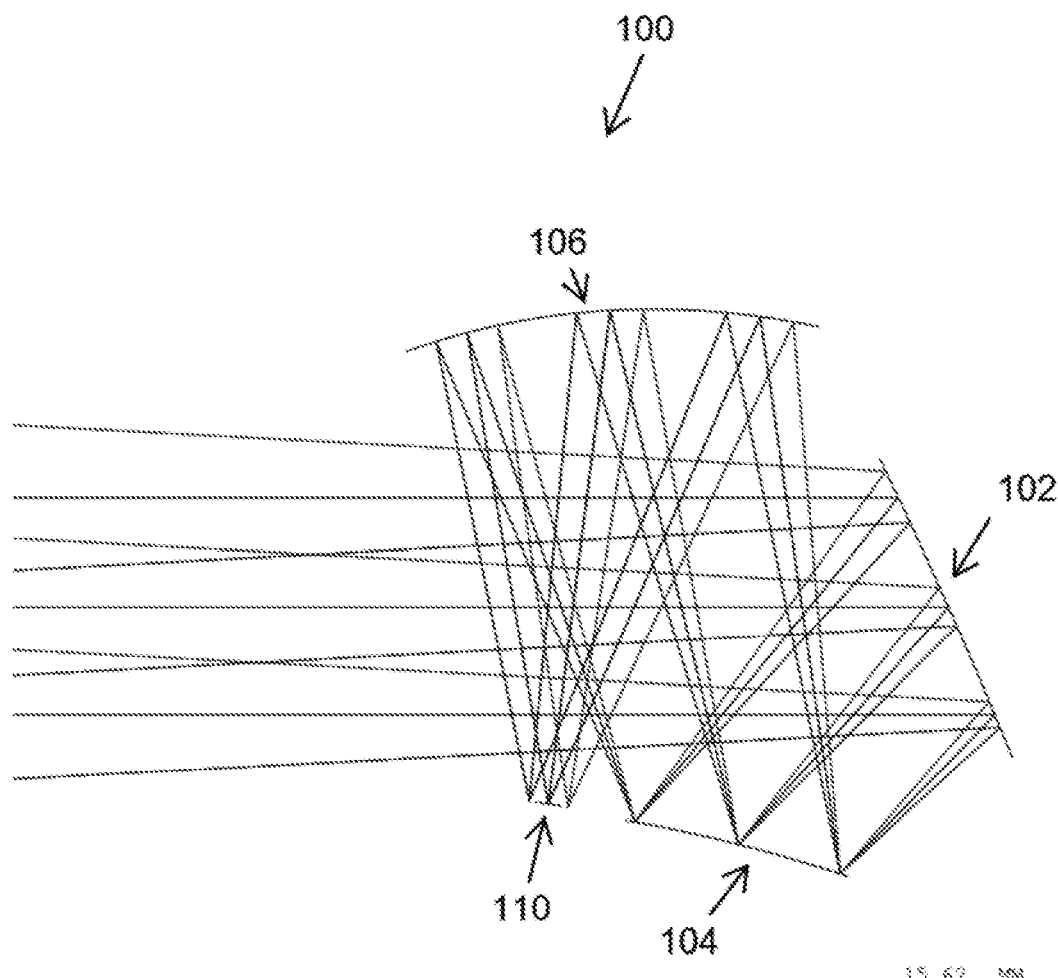
FIG. 1 is an optical path diagram of one embodiment of a freeform surface off-axis three-mirror optical system.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be that while essentially conforming to the particular dimension, shape, or other feature that is described, the component is not or need not be exactly conforming to the description. The term "comprising," when utilized, means "including, but not necessarily limited to"; it specifically indicates open-ended inclusion or membership in the so-described combination, group, series, and the like.

Figure 2:
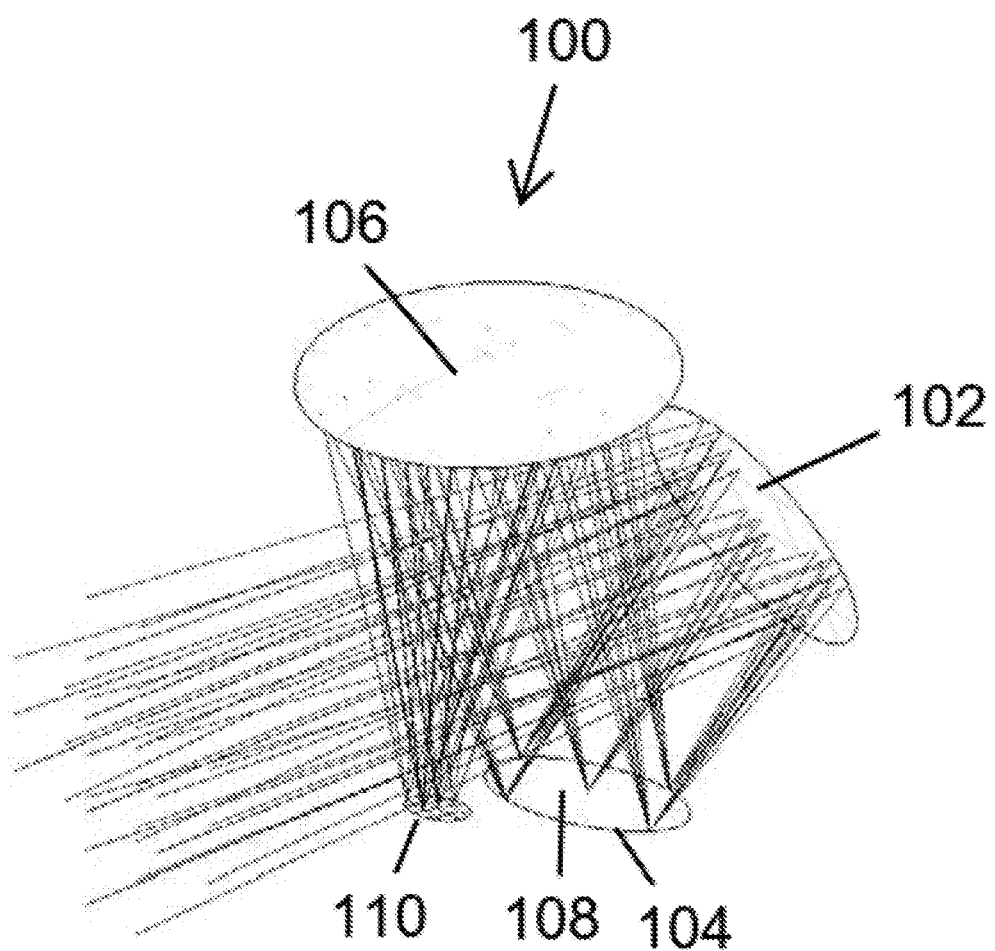
FIG. 2 is a structure diagram of the freeform surface off-axis three-mirror optical system in FIG. 1.

FIGS. 1 and 2 illustrate one embodiment of a freeform surface off-axis three-mirror optical system 100 comprises a primary mirror 102, a secondary mirror 104, a tertiary mirror 106, an aperture stop 108, and an image surface 110. An object is at infinity. A light emitted from the object enters the freeform surface off-axis three-mirror optical system 100 and reflects on the primary mirror 102, to form a first reflected light beam. The first reflected light beam irradiates and reflects on the secondary mirror 104, to form a second reflected light beam. After the second reflected light beam passes through an incident light beam of the primary mirror 102, the second reflected light beam irradiates on the tertiary mirror 106 and reflects on the tertiary mirror 106, to form a third reflected light beam. The third reflected light beam passes through the incident light beam of the primary mirror 102 and does not pass through a reflected light beam of the secondary mirror 104, and finally reaches the image surface 110 for imaging. The image surface 110 is located on one side of the reflected light beam of the secondary mirror 104, and the primary mirror 102 is located on the other side of the reflected light beam of the secondary mirror 104. The aperture stop 108 is located on the secondary mirror 104.

A global coordinate system (x, y, z) is defined in a space of the freeform surface off-axis three-mirror optical system 100. Starting from an origin of the global coordinate system (x, y, z), a vertical upward direction is defined as a positive direction of a y-axis of the global coordinate system (x, y, z), an horizontal right direction is defined as a positive direction of a z-axis of the global coordinate system (x, y, z), and an inward direction perpendicular to a plane shown in FIG. 1 is defined as a positive direction of an x-axis of the global coordinate system (x, y, z).

A field of view of the freeform surface off-axis three-mirror optical system 100 is specified in the global coordinate system (x, y, z). A light of a central field is incident along the positive direction of the z-axis of the global coordinate system (x, y, z), and the field of view is 0° on the x-axis and 0° on the y-axis.

In the global coordinate system (x, y, z); a first local coordinate system $(x_1, y_1, z_1)$ is defined with a point on the primary mirror 102 as a first origin. A position and an angle of the primary mirror 102 are described by the first local coordinate system $(x_1, y_1, z_1)$. In the global coordinate system $(x, y, z)$; a second local coordinate system $(x_2, y_2, z_2)$ is defined with a point on the secondary mirror 104 as a second origin. A position and an angle of the secondary mirror 104 are described by the second local coordinate system $(x_2, y_2, z_2)$. In the global coordinate system $(x, y, z)$; a third local coordinate system $(x_3, y_3, z_3)$ is defined with a point on the tertiary mirror 106 as a third origin. A position and an angle of the tertiary mirror 106 are described by the third local coordinate system $(x_3, y_3, z_3)$. In the global coordinate system $(x, y, z)$; a fourth local coordinate system $(x_4, y_4, z_4)$ is defined. A position and an angle of the aperture stop 108 are described by the fourth local coordinate system $(x_4, y_4, z_4)$. In the global coordinate system $(x, y, z)$, a fifth local coordinate system $(x_5, y_5, z_5)$ is defined. A position and an angle of the image surface 110 are described by the fifth local coordinate system $(x_5, y_5, z_5)$.

The first origin, the second origin, the third origin, an origin of the fourth local coordinate system $(x_4, y_4, z_4)$, and an origin of the fifth local coordinate system $(x_5, y_5, z_5)$ are located at different positions in the global coordinate system $(x, y, z)$. Each of the first local coordinate system $(x_1, y_1, z_1)$, the second local coordinate system $(x_2, y_2, z_2)$, the third local coordinate system $(x_3, y_3, z_3)$, the fourth local coordinate system $(x_4, y_4, z_4)$, and the fifth local coordinate system $(x_5, y_5, z_5)$ is obtained by translating the global coordinate system $(x, y, z)$ first to make the origin of the global coordinate system $(x, y, z)$ coincided with the origin of each of the first local coordinate system $(x_1, y_1, z_1)$, the second local coordinate system $(x_2, y_2, z_2)$, the third local coordinate system $(x_3, y_3, z_3)$, the fourth local coordinate system $(x_4, y_4, z_4)$, and the fifth local coordinate system $(x_5, y_5, z_5)$, and then rotating the global coordinate system $(x, y, z)$ around the x-axis of the global coordinate system $(x, y, z)$.

The first local coordinate system $(x_1, y_1, z_1)$ is obtained by moving the global coordinate system $(x, y, z)$ for about 1.104 millimeters along a negative direction of the y-axis, and translating about 102.627 millimeters in the positive direction of the z-axis, and then rotating about 24.135 degrees in a clockwise direction with the x-axis as a rotation axis. The first origin of the first local coordinate system $(x_1, y_1, z_1)$ is at a $(0, -1.104, 102.627)$ position of the global coordinate system $(x, y, z)$, and a unit of $(0, -1.104, 102.627)$ is millimeter. An angle between a positive direction of a $z_1$-axis and the positive direction of the z-axis in a counterclockwise direction is about 24.135 degrees. An angle between a positive direction of an $y_1$ axis and the positive direction of the y-axis in the counterclockwise direction is about 24.135 degrees. In one embodiment, the first origin of the first local coordinate system $(x_1, y_1, z_1)$ is at a $(0, 1.10381568076787, 102.626655002812)$ position of the global coordinate system $(x, y, z)$, and a unit of $(0, -1.10381568076787, 102.626655002812)$ is millimeter; the angle between the positive direction of the $z_1$-axis and the positive direction of the z-axis in the counterclockwise direction is about 24.1351442674759 degrees; and the angle between the positive direction of the $y_1$ axis and the positive direction of the y-axis in the counterclockwise direction is about 24.1351442674759 degrees.

The second local coordinate system $(x_2, y_2, z_2)$ is obtained by moving the global coordinate system $(x, y, z)$ for about 31.787 millimeters along the negative direction of the y-axis, and translating about 75.292 millimeters in the positive direction of the z-axis, and then rotating about 75.888 degrees in a clockwise direction with the x-axis as the rotation axis. The second origin of the second local coordinate system $(x_2, y_2, z_2)$ is at a $(0, -31.787, 75.292)$ position of the global coordinate system $(x, y, z)$, and a unit of $(0, -31.787, 75.292)$ is millimeter. An angle between a positive direction of an $z_2$-axis and the positive direction of the z-axis in a counterclockwise direction is about 75.888 degrees. An angle between a positive direction of an $y_2$ axis and the positive direction of the y-axis in the counterclockwise direction is about 75.888 degrees. In one embodiment, the second origin of the second local coordinate system $(x_2, y_2, z_2)$ is at a $(0, -31.787, 75.292)$ position of the global coordinate system $(x, y, z)$, and a unit of $(0, -31.787, 75.292)$ is millimeter; the angle between the positive direction of the $z_2$-axis and the positive direction of the z-axis in the counterclockwise direction is about 75.8875957179046 degrees; and the angle between the positive direction of the $y_2$ axis and the positive direction of the y-axis in the counterclockwise direction is about 75.8875957179046 degrees.

The third local coordinate system $(x_3, y_3, z_3)$ is obtained by moving the global coordinate system $(x, y, z)$ for about 37.260 millimeters along a positive direction of the y-axis, and translating about 58.716 millimeters in the positive direction of the z-axis, and then rotating about 86.745 degrees in the counterclockwise direction with the x-axis as a rotation axis. The third origin of the third local coordinate system $(x_3, y_3, z_3)$ is at a $(0, 37.260, 58.716)$ position of the global coordinate system $(x, y, z)$, and a unit of $(0, 37.260, 58.716)$ is millimeter. An angle between a positive direction of a $z_3$ axis and the positive direction of the z-axis in the clockwise direction is about 86.745 degrees. An angle between a positive direction of an y3-axis and the positive direction of the y-axis in the clockwise direction is about 86.745 degrees. In one embodiment, the third origin of the third local coordinate system $(x_3, y_3, z_3)$ is at a $(0, 37.2603949362013, 58.7158208567325)$ position of the global coordinate system $(x, y, z)$, and a unit of $(0, 37.2603949362013, 58.7158208567325)$ is millimeter; the angle between the positive direction of the $z_3$ axis and the positive direction of the z-axis in the clockwise direction is about 86.7448891652535 degrees; and the angle between the positive direction of the $y_3$-axis and the positive direction of the y-axis in the clockwise direction is about 86.7448891652535 degrees.

In the first local coordinate system $(x_1, y_1, z_1)$, a reflective surface of the primary mirror 102 is an $x_1 y_1$ polynomial freeform surface; and an $x_1 y_1$ polynomial equation can be expressed as follows:

$$z(x_1, y_1) = \frac{c(x_1^2 + y_1^2)}{1 + \sqrt{1 - (1+k)c^2(x_1^2 + y_1^2)}} + \sum_{i=1}^{N} A_i x_1^m y_1^n.$$

In the $x_1 y_1$ polynomial equation, z represents surface sag, c represents surface curvature, k represents conic constant, while $A_i$ represents the ith term coefficient. Since the freeform surface off-axis three-mirror optical system 100 is symmetrical about $y_1 z_1$ plane, even order terms of x can be only remained. In one embodiment, the reflective surface of the primary mirror 102 is a sixth-order polynomial freeform surface of $x_1 y_1$ without odd items of $x_1$; and an equation of the sixth-order polynomial freeform surface of $x_1 y_1$ can be expressed as follows:

$$z(x_1, y_1) = \frac{c(x_1^2 + y_1^2)}{1 + \sqrt{(1-k)c^2(x_1^2 + y_1^2)}} + A_2 y_1 + A_3 x_1^2 + A_5 y_1^2$$

-continued $$+A_7x_1^2y_1 + A_9y_1^3 + A_{10}x_1^4 + A_{12}x_1^2y_1^2 + A_{14}y_1^4 + A_{16}x_1^4y_1$$
$$+A_{18}x_1^2y_1^3 + A_{20}y_1^5 + A_{21}x_1^6 + A_{23}x_1^4y_1^2 + A_{25}x_1^2y_1^4$$
$$+A_{27}y_1^6.$$

In one embodiment, the values of c, k, and $A_i$ in the equation of the sixth-order polynomial freeform surface of $x_1y_1$ of the reflective surface of the primary mirror 102 are listed in Table 1. However, the values of c, k, and $A_i$ in the sixth order $x_1y_1$ polynomial equation are not limited to those appear in Table 1.

TABLE 1

| c | 1/−730.532842005918 |
|---|---|
| k | 24.0422193992546 |
| $A_2$ | 0.000246729637671358 |
| $A_3$ | 6.97934612035877e−005 |
| $A_5$ | −5.66079200969823e−005 |
| $A_7$ | 3.20341847719602e−007 |
| $A_9$ | 2.08819090396513e−006 |
| $A_{10}$ | 2.48884490895652e−008 |
| $A_{12}$ | 7.59894215139208e−008 |
| $A_{14}$ | 5.43920792984252e−008 |
| $A_{16}$ | −8.51381129011639e−011 |
| $A_{18}$ | −1.04179309196103e−009 |
| $A_{20}$ | −1.18245322636843e−009 |
| $A_{21}$ | −2.04448114908392e−011 |
| $A_{23}$ | −4.14416576500448e−011 |
| $A_{25}$ | −3.70094661977762e−011 |
| $A_{27}$ | −2.36924281934794e−011 |

In the second local coordinate system ($x_2$, $y_2$, $z_2$), a reflective surface of the secondary mirror 104 is an $x_2y_2$ polynomial freeform surface; and an $x_2y_2$ polynomial equation can be expressed as follows:

$$z(x_2, y_2) = \frac{c(x_2^2 + y_2^2)}{1 + \sqrt{1 - (1+k)c^2(x_2^2 + y_2^2)}} + \sum_{i=1}^{N} A_i x_2^m y_2^n.$$

In the $x_2y_2$ polynomial equation, z represents surface sag, c represents surface curvature, k represents conic constant, while $A_i$ represents the ith term coefficient. Since the freeform surface off-axis three-mirror optical system 100 is symmetrical about $y_2z_2$ plane, even order terms of $x_2$ can be only remained. In one embodiment, the reflective surface of the secondary mirror 104 is a sixth-order polynomial freeform surface of $x_2y_2$ without odd items of $x_2$; and an equation of the sixth-order polynomial freeform surface of $x_2y_2$ can be expressed as follows:

$$z(x_2, y_2) = \frac{c(x_2^2 + y_2^2)}{1 + \sqrt{1 - (1+k)c^2(x_2^2 + y_2^2)}} + A_2y_2 + A_3x_2^2 +$$
$$A_5y_2^2 + A_7x_2^2y_2 + A_9y_2^3 + A_{10}x_2^4 + A_{12}x_2^2y_2^2 + A_{14}y_2^4 + A_{16}x_2^4y_2 +$$
$$A_{18}x_2^2y_2^3 + A_{20}y_2^5 + A_{21}x_2^6 + A_{23}x_2^4y_2^2 + A_{25}x_2^2y_2^4 + A_{27}y_2^6.$$

In one embodiment, the values of c, k, and $A_i$ in the equation of the sixth-order polynomial freeform surface of $x_2y_2$ of the reflective surface of the secondary mirror 104 are listed in Table 2. However, the values of c, k, and $A_i$ in the sixth order $x_2y_2$ polynomial equation are not limited to those appear in Table 2.

TABLE 2

| c | 1/−203.487132083523 |
|---|---|
| k | 1.54294821473842 |
| $A_2$ | −0.000860410928618911 |
| $A_3$ | 0.00012600142707391 |
| $A_5$ | −9.0284705172288e−006 |
| $A_7$ | 1.69369884787012e−006 |
| $A_9$ | 2.19109698809227e−006 |
| $A_{10}$ | −2.69376207736187e−007 |
| $A_{12}$ | −3.96076779494982e−007 |
| $A_{14}$ | −9.33363785361872e−008 |
| $A_{16}$ | −7.90334832111255e−010 |
| $A_{18}$ | −3.16024862709822e−009 |
| $A_{20}$ | −3.57335994276518e−009 |
| $A_{21}$ | −1.35609770887567e−010 |
| $A_{23}$ | −3.06369391891789e−010 |
| $A_{25}$ | −2.68950876008045e−010 |
| $A_{27}$ | −1.53959261428871e−010 |

In the third local coordinate system ($x_3$, $y_{33}$, $z_3$), a reflective surface of the tertiary mirror 106 is an $x_3y_3$ polynomial freeform surface; and an $x_3y_3$ polynomial equation can be expressed as follows:

$$z(x_3, y_3) = \frac{c(x_3^2 + y_3^2)}{1 + \sqrt{1 - (1+k)c^2(x_3^2 + y_3^2)}} + \sum_{i=1}^{N} A_i x_3^m y_3^n.$$

In the $x_3y_3$ polynomial equation, z represents surface sag, c represents surface curvature, k represents conic constant, while $A_i$ represents the ith term coefficient. Since the freeform surface off-axis three-mirror optical system 100 is symmetrical about $y_3z_3$ plane, even order terms of $x_3$ can be only remained. In one embodiment, the reflective surface of the tertiary mirror 106 is a sixth-order polynomial freeform surface of $x_3y_3$ without odd items of $x_3$; and an equation of the sixth-order polynomial freeform surface of $x_3y_3$ can be expressed as follows:

$$z(x_3, y_3) = \frac{c(x_3^2 + y_3^2)}{1 + \sqrt{1 - (1+k)c^2(x_3^2 + y_3^2)}} + A_2y_3 + A_3x_3^2 +$$
$$A_5y_3^2 + A_7x_3^2y_3 + A_9y_3^3 + A_{10}x_3^4 + A_{12}x_3^2y_3^2 + A_{14}y_3^4 + A_{16}x_3^4y_3 +$$
$$A_{18}x_3^2y_3^3 + A_{20}y_3^5 + A_{21}x_3^6 + A_{23}x_3^4y_3^2 + A_{25}x_3^2y_3^4 + A_{27}y_3^6.$$

In one embodiment, the values of c, k, and $A_i$ in the equation of the sixth-order polynomial freeform surface of $x_3y_3$ of the reflective surface of the tertiary mirror 106 are listed in Table 3. However, the values of c, k, and $A_i$ in the sixth order $x_3y_3$ polynomial equation are not limited to those appear in Table 3.

TABLE 3

| c | 1/99.5687206310879 |
|---|---|
| k | 0.0302902817314741 |
| $A_2$ | 0.00235822336595969 |
| $A_3$ | −2.91314835683736e−005 |
| $A_5$ | −8.24459153262977e−006 |
| $A_7$ | −5.3781059023226e−006 |
| $A_9$ | −5.42849152246573e−006 |
| $A_{10}$ | 2.4638759094928e−008 |
| $A_{12}$ | 4.80522560093873e−008 |
| $A_{14}$ | 1.64260927029146e−008 |
| $A_{16}$ | −6.87367944383513e−010 |
| $A_{18}$ | −1.42010522966986e−009 |
| $A_{20}$ | −8.55535804581902e−010 |

TABLE 3-continued

| | |
|---|---|
| $A_{21}$ | 6.95246753539491e-012 |
| $A_{23}$ | 2.06779515968048e-011 |
| $A_{25}$ | 2.31301951824047e-011 |
| $A_{27}$ | 1.4237258016909e-011 |

The primary mirror 102, secondary mirror 104, and tertiary mirror 106 have high reflectivity. The materials of the primary mirror 102, the secondary mirror 104, and the tertiary mirror 106 can be aluminum, beryllium or other metals. The materials of the primary mirror 102, the secondary mirror 104, and the tertiary mirror 106 can also be silicon carbide, quartz or other inorganic materials. A reflection enhancing coating can also be coated on the metals or inorganic materials to enhance the reflectivity performance of the primary mirror 102, the secondary mirror 104, and the tertiary mirror 106. In one embodiment, the reflection enhancing coating is a gold film.

The fourth local coordinate system ($x_4$, $y_4$, $z_4$) is obtained by moving the global coordinate system (x, y, z) for about 32.247 millimeters along a negative direction of the y-axis, and translating about 75.177 millimeters in the positive direction of the z-axis, and then rotating about 75.920 degrees in the clockwise direction with the x-axis as a rotation axis. A fourth origin of the fourth local coordinate system ($x_4$, $y_4$, $z_4$) is at a (0, −32.247, 75.177) position of the global coordinate system (x, y, z), and a unit of (0, −32.247, 75.177) is millimeter. An angle between a positive direction of a z4-axis and the positive direction of the z-axis in the counterclockwise direction is about 75.920 degrees. An angle between a positive direction of an y4-axis and the positive direction of the y-axis in the counterclockwise direction is about 75.920 degrees. In one embodiment, the fourth origin of the third local coordinate system ($x_4$, $y_4$, $z_4$) is at a (0, −32.2468143139100, 75.1768294383900) position of the global coordinate system (x, y, z), and a unit of (0, −32.2468143139100, 75.1768294383900) is millimeter; the angle between the positive direction of the $z_4$-axis and the positive direction of the z-axis in the counterclockwise direction is about 75.9204361315113 degrees; and the angle between the positive direction of the $y_4$-axis and the positive direction of the y-axis in the counterclockwise direction is about 75.9204361315113 degrees.

A center of the aperture stop 108 is located at the fourth origin of the fourth local coordinate system ($x_4$, $y_4$, $z_4$), and the aperture stop 108 is located on the secondary mirror 104. A shape of the aperture stop 108 is not limited. In one embodiment, the aperture stop 108 is circular, a radius of the aperture stop 108 is about 13.776 millimeters, and an outer edge of the aperture stop 108 coincides with an outer edge of the secondary mirror 104.

The fifth local coordinate system ($x_5$, $y_5$, $z_5$) is obtained by moving the global coordinate system (x, y, z) for about 26.621 millimeters along the negative direction of the y-axis, and translating about 50.525 millimeters along the positive direction of the z-axis, and then rotating about 80.5 degrees in the clockwise direction with the x-axis as a rotation axis. A fifth origin of the fifth local coordinate system ($x_5$, $y_5$, $z_5$) is at a (0, −26.621, 50.525) position of the global coordinate system (x, y, z), and a unit of (0, −26.621, 50.525) is millimeter. An angle between a positive direction of a z5-axis and the positive direction of the z-axis in the counterclockwise direction is about 80.5 degrees. An angle between a positive direction of an y5-axis and the positive direction of the y-axis in the counterclockwise direction is about 80.5 degrees. In one embodiment, the fifth origin of the fifth local coordinate system ($x_5$, $y_5$, $z_5$) is at a (0, −26.6209900649064, 50.5251773475422) position of the global coordinate system (x, y, z), and a unit of (0, −26.6209900649064, 50.5251773475422) is millimeter; the angle between the positive direction of the $z_5$-axis and the positive direction of the z-axis in the counterclockwise direction is about 80.5 degrees; and the angle between a positive direction of an $y_5$-axis and the positive direction of the y-axis in the counterclockwise direction is about 80.5 degrees.

A center of the image surface 110 is located at the fifth origin of the fifth local coordinate system ($x_5$, $y_5$, $z_5$), and the image surface 110 is located in the $x_5z_5$ plane of the fifth local coordinate system ($x_5$, $y_5$, $z_5$).

An entrance pupil diameter of the freeform surface off-axis three-mirror optical system 100 is 27.78 millimeters.

The freeform surface off-axis three-mirror optical system 100 adopts an off-axis field in the vertical direction. A field angle of the freeform surface off-axis three-mirror optical system 100 is ranged from 6°×4° to 10°×8°, wherein the field angle in the x-axis is from about 6° to about 10°, and the field angle in the y-axis is from about 4° to about 8°. In one embodiment, the field angle of the freeform surface off-axis three-mirror optical system 100 is 8°×6°, wherein the angle in the x-axis is in a range from about −4° to about 4°, and the angle in the y-axis is in a range from about −3° to about 3°.

A wavelength of the freeform surface off-axis three-mirror optical system 100 is not limited. In one embodiment, the wavelength of the freeform surface off-axis three-mirror optical system 100 is ranged from about 4 micrometers to about 1000 nanometers.

A focal length of the freeform surface off-axis three-mirror optical system 100 is 50 millimeters.

An F-number of the freeform surface off-axis three-mirror optical system 100 is ranged from 1.6 to 8.0. A relative aperture (D/f) is the reciprocal of the F-number. In one embodiment, the F-number of the freeform surface off-axis three-mirror optical system 100 is 1.8, and the relative aperture (D/f) is 0.56.

Under the same system indexes, a volume of the freeform surface off-axis three-mirror optical system 100 is much smaller than that of the conventional freeform surface off-axis three-mirror optical systems. Therefore, the freeform surface off-axis three-mirror optical system 100 is important for a production of smaller optical components. The system indexes comprise focal length, field F number, and other system parameters. For example, under the same system indicators, the volume of the conventional freeform surface off-axis three-mirror optical systems is about 0.1654 liters; a volume of a conventional freeform surface off-axis three-mirror optical system with a convex primary mirror has about 0.9842 liters, the volume of the freeform surface off-axis three-mirror optical system 100 is only 0.0945 liters. Under the system indexes with a field of view of 8°×6°, a focal length of 50 millimeters, and an F number of 1.8, the volume of the freeform surface off-axis three-mirror optical system 100 can reach 0.0828 liters or less. In one embodiment, the volume of the freeform surface off-axis three-mirror optical system 100 is 0.0828 liters. The volume of the freeform surface off-axis three-mirror optical system 100 refers to an outer envelope volume of the freeform surface off-axis three-mirror optical system 100.

Figure 3:
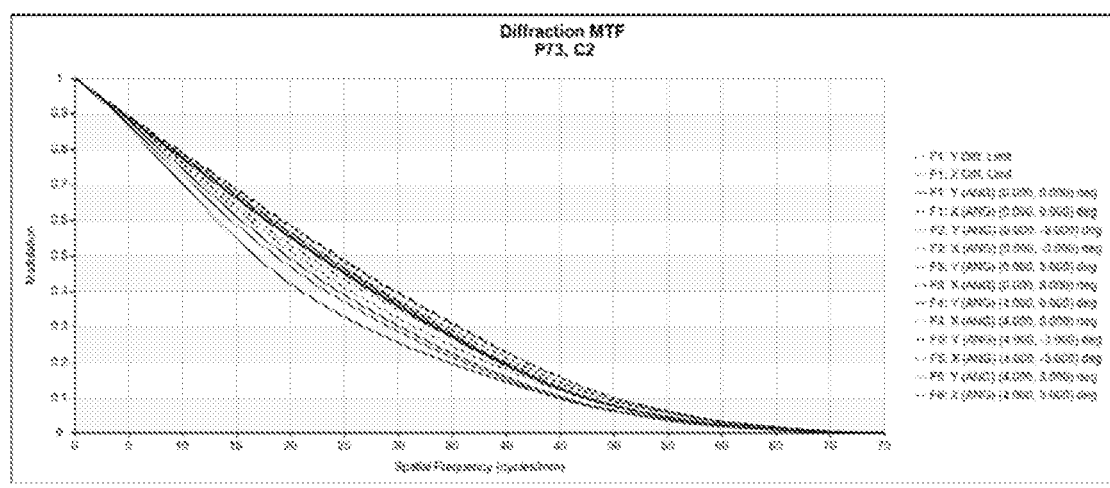
FIG. 3 is a modulation transfer function (MTF) of one embodiment of the freeform surface off-axis three-mirror optical system in a long-wave infrared band of 8 to 12 microns of partial field angles.

Referring to FIG. 3, a modulation transfer function (MTF) of the freeform surface off-axis three-mirror optical system 100 in a long-wave infrared band of 8 to 12 microns of partial field angles are close to the diffraction limit. It shows that an imaging quality of the freeform surface off-axis three-mirror optical system 100 is high.

Figure 4:
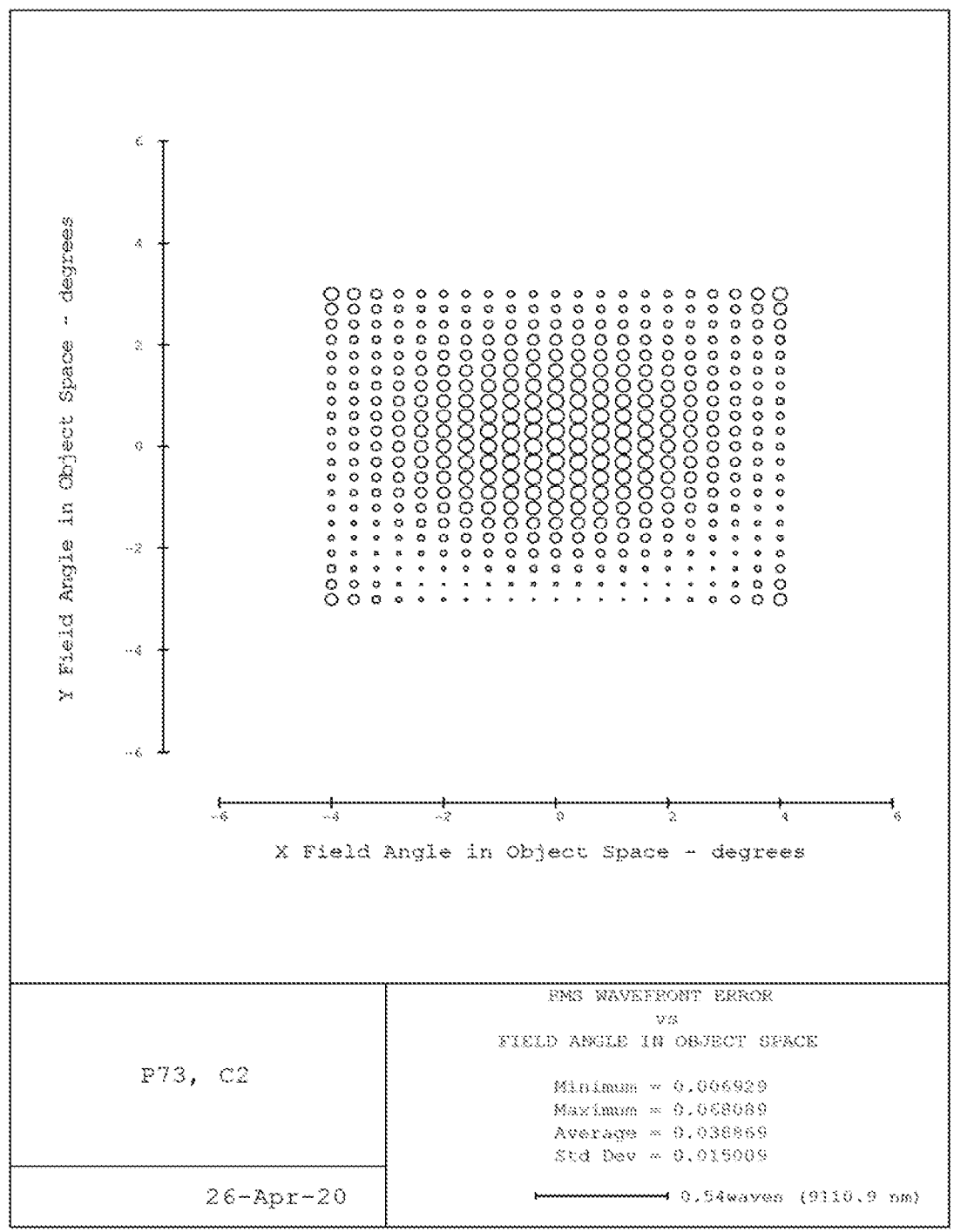
FIG. 4 is a RMS wavefront error average of one embodiment of the freeform surface off-axis three-mirror optical system.

Referring to FIG. 4, a RMS wavefront error average of the freeform surface off-axis three-mirror optical system 100 is 0.038869λ, wherein λ=9110.9 nm. The RMS wavefront error is small. It shows that the imaging quality of the freeform surface off-axis three-mirror optical system 100 is excellent.

The applications of the freeform surface off-axis three-mirror optical system 100 comprise earth observation, space target detection, astronomical observations, Multi-spectral thermal imaging, and dimensional mapping. The freeform surface off-axis three-mirror optical system 100 can be used in the infrared band. The freeform surface off-axis three-mirror optical system 100 can also be used in visible light band after optimization.

Taking the freeform surface off-axis three-mirror optical system 100 as an initial structure, a system with similar structure but different surface coefficients can be obtained after simple optimization, the system with similar structure but different surface coefficients should be included in a protection scope of the present invention.

The freeform surface off-axis three-mirror optical system provided by the present disclosure has the following advantages: compared with the conventional freeform surface off-axis three-mirror optical systems, the freeform surface off-axis three-mirror optical system provided by the present disclosure has a smaller volume and compact structure under the same system indexes, such as focal length, field of view, and F number. The optical paths of the reflected light beams of the secondary mirror and the tertiary mirror overlap with the optical paths of the incident light beams of the primary mirror, thereby making the freeform surface off-axis three-mirror optical system compact and small in size. The freeform surface off-axis three-mirror optical system of the present disclosure has a large rectangular field; therefore, an imaging range of the freeform surface off-axis three-mirror optical system is large. The freeform surface off-axis three-mirror optical system has a small F number and a large relative aperture, more light rays can enter the freeform surface off-axis three-mirror optical system; therefore, the freeform surface off-axis three-mirror optical system has high input energy and limit resolution. The freeform surface off-axis three-mirror optical system is an unobstructed optical system; therefore, the freeform surface off-axis three-mirror optical system has a high energy utilization rate.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A freeform surface off-axis three-mirror optical system comprising:
a primary mirror, wherein an incident light beam emitted from an object irradiates and is reflected on the primary mirror, to form a first reflected light beam; a global coordinate system (x, y, z) is defined in a space of the freeform surface off-axis three-mirror optical system, and in the global coordinate system (x, y, z), a first local coordinate system $(x_1, y_1, z_1)$ is defined with a point on the primary mirror as a first origin, and a reflective surface of the primary mirror is an $x_1y_1$ polynomial freeform surface;

a secondary mirror, wherein the first reflected light beam irradiates and is reflected on the secondary mirror to form a second reflected light beam; and in the global coordinate system (x, y, z), a second local coordinate system $(x_2, y_2, z_2)$ is defined with a point on the secondary mirror as a second origin, and a reflective surface of the secondary mirror is an $x_2y_2$ polynomial freeform surface;

a tertiary mirror, wherein the second reflected light beam passes through the incident light beam, and then irradiates and is reflected on the tertiary mirror to form a third reflected light beam; and a reflective surface of the tertiary mirror is an $x_3y_3$ polynomial freeform surface; and in the global coordinate system (x, y, z), a third local coordinate system $(x_3, y_3, z_3)$ is defined with a point on the tertiary mirror as a third origin, and a reflective surface of the tertiary mirror is an $x_3y_3$ polynomial freeform surface;

an aperture stop located on the secondary mirror; and an image surface, wherein the third reflected light beam passes through the incident light beam and does not pass through the secondary mirror, and finally reaches the image surface for imaging, wherein the image surface is located on one side of the second reflected light beam, and the primary mirror is located on the other side of the second reflected light beam.

2. The system as claimed in claim 1, wherein the first local coordinate system $(x_1, y_1, z_1)$ is obtained by moving the global coordinate system (x, y, z) for about 1.104 millimeters along a negative direction of a y-axis, and translating about 102.627 millimeters in a positive direction of a z-axis, and then rotating about 24.135 degrees in a clockwise direction with an x-axis as a rotation axis.

3. The system as claimed in claim 1, wherein the first origin of the first local coordinate system $(x_1, y_1, z_1)$ is at a (0, −1.104, 102.627) position of the global coordinate system (x, y, z), and a unit of (0, −1.104, 102.627) is millimeter.

4. The system as claimed in claim 1, wherein the reflective surface of the primary mirror is a sixth-order polynomial freeform surface of $x_1y_1$ without odd items of $x_1$; and an equation of the sixth-order polynomial freeform surface of $x_1y_1$ is:

$$z(x_1, y_1) = \frac{c(x_1^2 + y_1^2)}{1 + \sqrt{1-(1+k)c^2(x_1^2+y_1^2)}} + A_2 y_1 + A_3 x_1^2 + A_5 y_1^2 + A_7 x_1^2 y_2 + A_9 y_1^3 + A_{10} x_1^4 + A_{12} x_1^2 y_1^2 + A_{14} y_1^4 + A_{16} x_1^4 y_1 + A_{18} x_1^2 y_1^3 + A_{20} y_1^5 + A_{21} x_1^6 + A_{23} x_1^4 y_1^2 + A_{25} x_1^2 y_1^4 + A_{27} y_1^6,$$

wherein z represents surface sag, c represents surface curvature, k represents conic constant, while $A_i$ represents the ith term coefficient.

5. The system as claimed in claim 4, wherein c=1/−730.532842005918, k=24.0422193992546, $A_2$=0.000246729637671358, $A_3$=6.97934612035877e-005, $A_5$=−5.66079200969823e-005, $A_7$=3.20341847719602e-007, $A_9$=2.08819090396513e-006, $A_{10}$=2.48884490895652e-008, $A_{12}$=7.59894215139208e-008, $A_{14}$=5 0.43920792984252e-008, $A_{16}$=−

8.51381129011639e-011, $A_{18}$=-1.04179309196103e-009, $A_{20}$=-1.18245322636843e-009, $A_{21}$=-2.04448114908392e-011, $A_{23}$=-4.14416576500448e-011, $A_{25}$=-3.70094661977762e-011, and $A_{27}$=-2.36924281934794e-011.

6. The system as claimed in claim 1, wherein the second local coordinate system ($x_2$, $y_2$, $z_2$) is obtained by moving the global coordinate system (x, y, z) for about 31.787 millimeters along a negative direction of a y-axis, and translating about 75.292 millimeters in a positive direction of a z-axis, and then rotating about 75.888 degrees in a clockwise direction with an x-axis as a rotation axis.

7. The system as claimed in claim 1, wherein the second origin of the second local coordinate system ($x_2$, $y_2$, $z_2$) is at a (0, −31.787, 75.292) position of the global coordinate system (x, y, z), and a unit of (0, −31.787, 75.292) is millimeter.

8. The system as claimed in claim 1, wherein the reflective surface of the secondary mirror is a sixth-order polynomial freeform surface of $x_2y_2$ without odd items of $x_2$; and an equation of the sixth-order polynomial freeform surface of $x_2y_2$ is:

$$z(x_2, y_2) = \frac{c(x_2^2 + y_2^2)}{1 + \sqrt{1 - (1+k)c^2(x_2^2 + y_2^2)}} + A_2 y_2 + A_3 x_2^2 +$$
$$A_5 y_2^2 + A_7 x_2^2 y_2 + A_9 y_2^3 + A_{10} x_2^4 + A_{12} x_2^2 y_2^2 + A_{14} y_2^4 + A_{16} x_2^4 y_2 +$$
$$A_{18} x_2^2 y_2^3 + A_{20} y_2^5 + A_{21} x_2^6 + A_{23} x_2^4 y_2^2 + A_{25} x_2^2 y_2^4 + A_{27} y_2^6,$$

wherein z represents surface sag, c represents surface curvature, k represents conic constant, while $A_i$ represents the ith term coefficient.

9. The system as claimed in claim 8, wherein c=1/−203.487132083523, k=1.54294821473842, $A_2$=−0.000860410928618911, $A_3$=0.00012600142707391, $A_5$=−9.0284705172288e-006, $A_7$=1.69369884787012e-006, $A_9$=2.19109698809227e-006, $A_{10}$=−2.69376207736187e-007, $A_{12}$=−3.96076779494982e-007, $A_{14}$=−9.33363785361872e-008, $A_{16}$=−7.90334832111255e-010, $A_{18}$=−3.16024862709822e-009, $A_{20}$=−3.57335994276518e-009, $A_{21}$=−1.35609770887567e-010, $A_{23}$=−3.06369391891789e-010, $A_{25}$=−2.68950876008045e-010, and $A_{27}$=−1.53959261428871e-010.

10. The system as claimed in claim 1, wherein the third local coordinate system ($x_3$, $y_3$, $z_3$) is obtained by moving the global coordinate system (x, y, z) for about 37.260 millimeters along a positive direction of a y-axis, and translating about 58.716 millimeters in a positive direction of a z-axis, and then rotating about 86.745 degrees in a counterclockwise direction with an x-axis as a rotation axis.

11. The system as claimed in claim 1, wherein the third origin of the third local coordinate system ($x_3$, $y_3$, $z_3$) is at a (0, 37.260, 58.716) position of the global coordinate system (x, y, z), and a unit of (0, 37.260, 58.716) is millimeter.

12. The system as claimed in claim 1, wherein the reflective surface of the tertiary mirror is a sixth-order polynomial freeform surface of $x_3y_3$ without odd items of $x_3$; and an equation of the sixth-order polynomial freeform surface of $x_3y_3$ is:

$$z(x_3, y_3) = \frac{c(x_3^2 + y_3^2)}{1 + \sqrt{1 - (1+k)c^2(x_3^2 + y_3^2)}} + A_2 y_3 + A_3 x_3^2 +$$
$$A_5 y_3^2 + A_7 x_3^2 y_3 + A_9 y_3^3 + A_{10} x_3^4 + A_{12} x_3^2 y_3^2 + A_{14} y_3^4 + A_{16} x_3^4 y_3 +$$
$$A_{18} x_3^2 y_3^3 + A_{20} y_3^5 + A_{21} x_3^6 + A_{23} x_3^4 y_3^2 + A_{25} x_3^2 y_3^4 + A_{27} y_3^6,$$

wherein z represents surface sag, c represents surface curvature, k represents conic constant, while $A_i$ represents the ith term coefficient.

13. The system as claimed in claim 12, wherein c=1/99.5687206310879, k=0.0302902817314741, $A_2$=0.00235822336595969, $A_3$=−2.91314835683736e-005, $A_5$=−8.24459153262977e-006, $A_7$=−5.3781059023226e-006, $A_9$=−5 0.42849152246573 e-006, $A_{10}$=2.4638759094928e-008, $A_{12}$=4.80522560093873e-008, $A_{14}$=1.64260927029146e-008, $A_{16}$=−6.87367944383513e-010, $A_{18}$=−1.42010522966986e-009, $A_{20}$=−8.55535804581902e-010, $A_{21}$=6.95246753539491e-012, $A_{23}$=2.06779515968048e-011, $A_{25}$=2.31301951824047e-011, and $A_{27}$=1.4237258016909e-011.

14. The system as claimed in claim 1, wherein the aperture stop is circular, a radius of the aperture stop is about 13.776 millimeters, and an outer edge of the aperture stop coincides with an outer edge of the secondary mirror.

15. The system as claimed in claim 1, wherein a field angle of the freeform surface off-axis three-mirror optical system is ranged from 6°×4° to 10°×8°, wherein the field angle in an x-axis is in a range from about 6° to about 10°, and the field angle in a y-axis is in a range from about 4° to about 8°.

16. The system as claimed in claim 1, wherein an F-number of the freeform surface off-axis three-mirror optical system is ranged from 1.6 to 8.0.

17. The system as claimed in claim 1, wherein a field of view of the freeform surface off-axis three-mirror optical system is 8°×6°, a focal length is 50 millimeters, and an F number of the freeform surface off-axis three-mirror optical system is 1.8.

18. The system as claimed in claim 17, wherein a volume of the freeform surface off-axis three-mirror optical system is less than or equal to 0.0828 liters.

19. The system as claimed in claim 1, wherein in the global coordinate system (x, y, z), a fourth local coordinate system ($x_4$, $y_4$, $z_4$) is obtained by moving the global coordinate system (x, y, z) for about 32.247 millimeters along a negative direction of a y-axis, and translating about 75.177 millimeters in a positive direction of a z-axis, and then rotating about 75.920 degrees in a clockwise direction with an x-axis as a rotation axis; and a center of the aperture stop is located at a fourth origin of the fourth local coordinate system ($x_4$, $y_4$, $z_4$).

20. The system as claimed in claim 1, wherein in the global coordinate system (x, y, z), a fifth local coordinate system ($x_5$, $y_5$, $z_5$) is obtained by moving the global coordinate system (x, y, z) for about 26.621 millimeters along a negative direction of a y-axis, and translating about 50.525 millimeters along a positive direction of a z-axis, and then rotating about 80.5 degrees in a clockwise direction with an x-axis as a rotation axis; and a center of the image surface is located at a fifth origin of the fifth local coordinate system ($x_5$, $y_5$, $z_5$), and the image surface is located in an $x_5z_5$ plane of the fifth local coordinate system ($x_5$, $y_5$, $z_5$).

* * * * *